United States Patent [19]

Blonder

[11] Patent Number: 5,103,376
[45] Date of Patent: Apr. 7, 1992

[54] DUAL POSITION COMPUTER ARRANGEMENT

[75] Inventor: Greg E. Blonder, Summit, N.J.

[73] Assignee: AT&T Bell Laboratories, Murray Hill, N.J.

[21] Appl. No.: 656,379

[22] Filed: Feb. 19, 1991

[51] Int. Cl.$^5$ .................. H05K 5/02; G06F 1/00; E05D 15/50

[52] U.S. Cl. .................. 361/393; 361/380; 248/918; 16/229; 16/231; 364/708

[58] Field of Search .............. 248/918, 923; 16/229, 16/230, 231; 364/708; 361/380, 390, 391, 392, 393, 394, 395, 399

[56] References Cited

U.S. PATENT DOCUMENTS

| | | | |
|---|---|---|---|
| 1,972,575 | 9/1934 | Schmidt | 16/229 X |
| 2,534,998 | 12/1950 | Steinbach | 16/229 |
| 3,690,035 | 9/1972 | Schindlauer | 16/230 X |
| 4,178,657 | 12/1979 | Way, Jr. | 16/229 |
| 4,532,673 | 8/1985 | Kim | 16/230 X |
| 4,589,659 | 5/1986 | Yokoi et al. | 364/708 X |
| 4,594,750 | 6/1986 | Carcas | 16/229 |
| 4,697,385 | 10/1987 | Zachariasen | 16/229 X |
| 4,859,092 | 8/1989 | Makita | 248/923 X |

FOREIGN PATENT DOCUMENTS

| | | | |
|---|---|---|---|
| 60-160418 | 8/1985 | Japan | 364/708 |
| 60-189525 | 9/1985 | Japan | 364/708 |

Primary Examiner—Leo P. Picard
Assistant Examiner—Michael W. Phillips
Attorney, Agent, or Firm—David R. Padnes

[57] ABSTRACT

A computer including a keyboard portion and a display portion is interconnected in a manner which provides dual positions operational. In one position the keyboard portion may be horizontally positioned to facilitate the entry of data via the keyboard. In the other position, the display portion may be horizontally positioned to facilitate the entry of data or graphic designs via the interaction of a graphics pen over the display. Advantageously, the interconnection mechanism which provides the two positions maintains the readability of the display and the keyboard portions in either of the two positions.

7 Claims, 6 Drawing Sheets

DUAL POSITION COMPUTER ARRANGEMENT

TECHNICAL FIELD

The present invention relates to computers and, more particularly, to computers having interconnected components, such as laptop computers.

BACKGROUND OF THE INVENTION

Computers, such as personal and laptop, typically comprise a keyboard and a display portion. In laptop and personal computers, data is generally entered into the computer via the keyboard. In addition, graphics pens, including light pens, capacitive-sensing and electromagnetic devices, are often added to this system to provide computer data entry in the form of graphical designs or alphanumeric characters. When data is primarily entered via the keyboard, such entry is facilitated when the keyboard and display are respectively disposed in a horizontal and vertical position relative to the user. When data is primarily entered via the graphics pen, however, such entry is facilitated by a reversal of the above-described positions of the keyboard and display portions relative to the computer user. The problem in present computers with reversing the position of the keyboard and display portions relative to a computer user by simply rotating the computer is that in one position the graphics and keyboard characters are in their normal orientation relative to the computer user; and in the other, the desired positions are upside down and reversed relative to the computer user. While the graphics image on the display can be inverted and reversed via the addition of hardware and software as the position of the display portion is changed relative to the computer user, the problem of the upside-down and reversed position of the keyboard characters remains and has never been addressed.

SUMMARY OF THE INVENTION

The present invention relates to a computer arrangement wherein the position of the keyboard and display portions can be reversed so as to provide optimum positioning relative to a computer user for data entry via the keyboard in one mode and optimum data entry via a graphics pen in another mode. In the disclosed embodiments, the reversal of the display and keyboard positions relative to the computer user is provided by a mechanism interconnecting those portions which maintains the left-to-right readability of the characters on the display and keyboard portions in each of the modes or positions. In the disclosed embodiments, the computer keyboard and display portions form a dihedron and the interconnecting mechanism is such that either the top or bottom edge of the keyboard is at the vertex of the dihedron.

DETAILED DESCRIPTION

Figure 1:
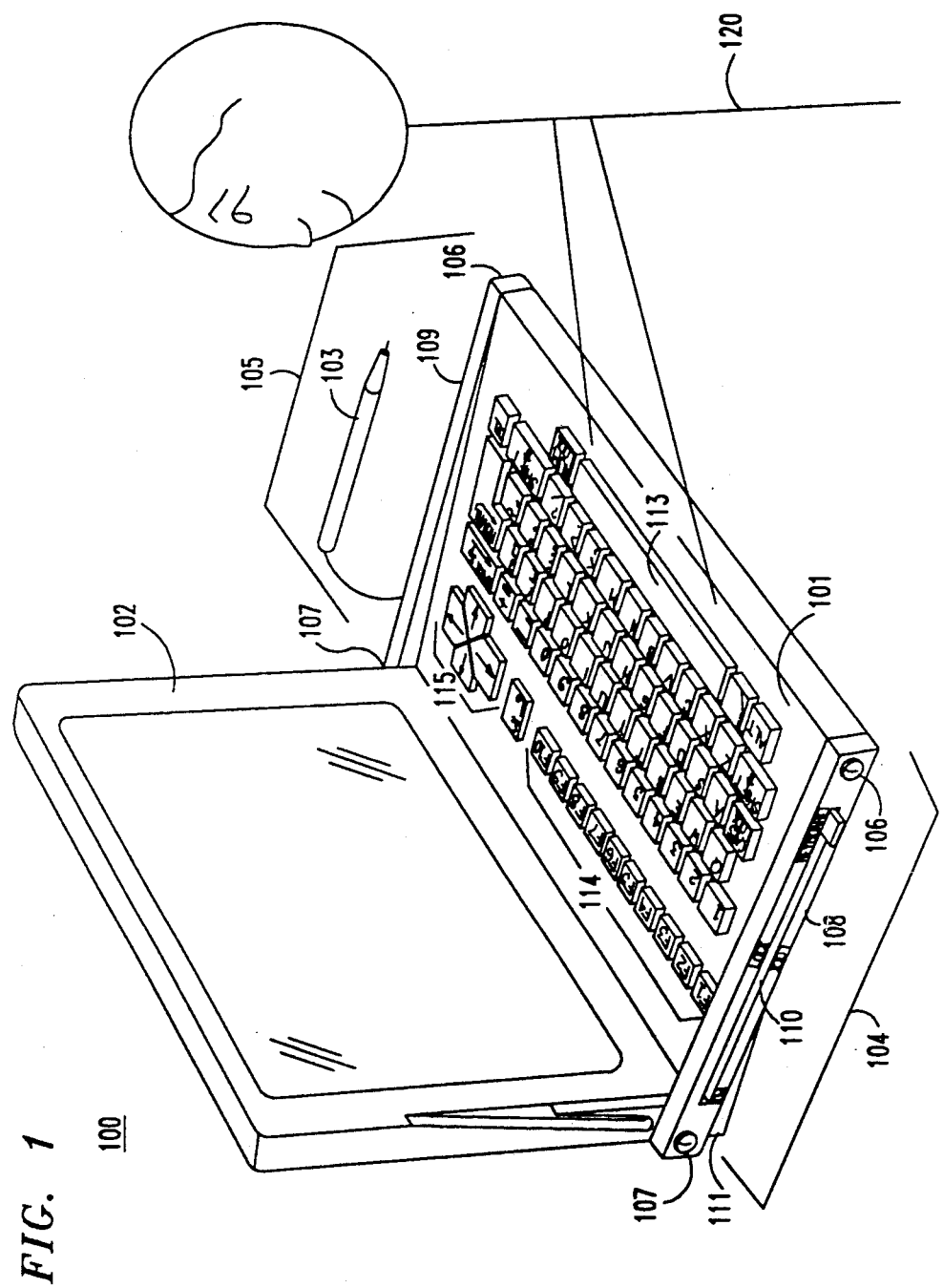
FIGS. 1 and 2 are perspective views of a first embodiment of the present invention respectively arranged in first and second positions or modes.
Figure 2:
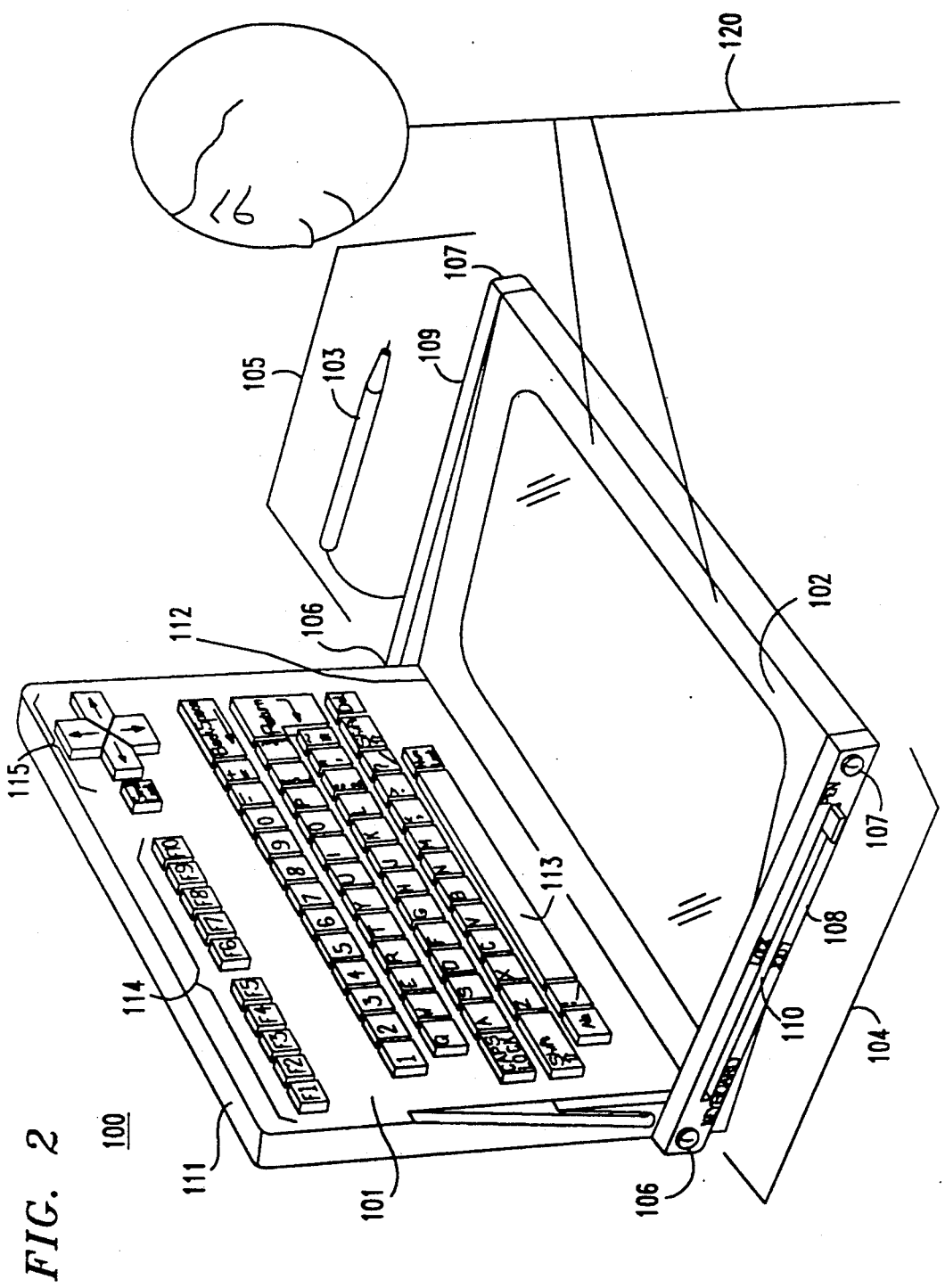

Referring to FIGS. 1 and 2, a laptop computer 100 including a keyboard portion 101 and a display portion 102 is shown. Computer 100 also includes a graphics pen 103 which interacts with the display portion using any of a number of well-known mechanisms to enter data or graphical designs. In regard to the former, it is envisioned that with character recognition systems, data can be entered into the computer by literally writing the data across the display screen using the graphics pen.

The keyboard and display portions form a dihedron, with the keyboard and display portions each forming a plane thereof. In addition, computer 100 also includes a pair of dual-pivoting hinges 104, 105 located at corresponding and opposite sides of the keyboard and display portions. The keyboard and display portions are electrically interconnected by well-known means (not shown). For example, the hinges can be fabricated to house the necessary electrical and/or optical interconnections between the keyboard and display portions. Each hinge incorporates a pair of pins 106 and 107 which respectively extend from the keyboard and display portions. The pairs of pins in hinges 104 and 105 are respectively interconnected by members 108 and 109, with member 108 including a longitudinal slot 110 to advantageously provide a mode selecting and locking mechanism, as will be described.

Each hinge provides rotational capability about both of its included pair of pins so as to facilitate two modes or operating positions. In the first mode, as shown in FIG. 1, the keyboard and display portions are respectively horizontally and vertically disposed so as to facilitate data entry into the computer via the keyboard for a computer user 120. Edge 111 of the keyboard portion in the first mode is adjacent to the display portion and is at the vertex of the dihedron formed by the keyboard and display portions. In the second mode, as shown in FIG. 2, the position of the keyboard and display portions are reversed so that the display portion is now horizontally disposed. Note that in the second mode, edge 111 of the keyboard portion is remote from the display portion and edge 112 of the keyboard portion is adjacent to the display portion and at the vertex of the dihedron. For purposes of this description, the term "at" a vertex means coincident with or close to the vertex. This horizontal position of the display portion in the second mode facilitates data entry via graphics pen 103 for computer user 120. It should be noted that, in accordance with the disclosed embodiment, the operation of the hinge provides the two modes of operation and maintains the readability of the display and keyboard in each mode. In addition, the relative position of the keys on the keyboard, such as the space bar 113, special function keys 114, and cursor movement keys 115, is also maintained.

Figure 3:
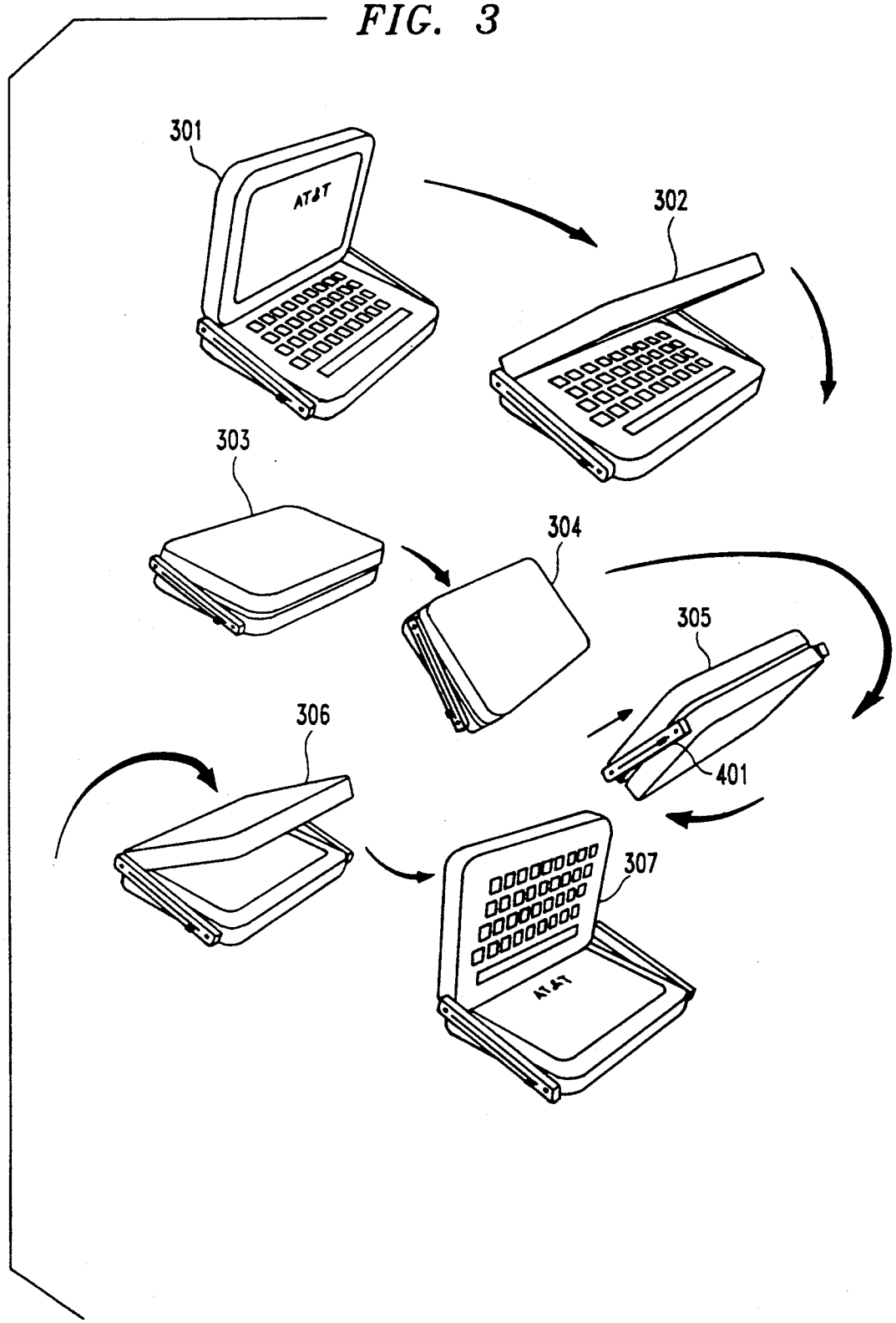
FIG. 3 is a sequence of views of the first embodiment showing the steps for converting from the first to the second mode.

FIG. 3 shows the operation of the hinge and the conversion from one mode to another. As shown in position 301, computer 100 is operational with the display portion in a vertical position. By closing the display portion over the keyboard portion as shown in position 302, the compact structure of position 303 is obtained. Position 303 is ideally suited for laptop computers, as both the keys of the keyboard and the screen of the display portion are protected in a compact structure. Now, by inverting the computer, as shown in successive positions 304, 305, and 306, and sliding element 401 to the "pen" position, as will be discussed in reference to FIG. 4, computer 100 can be re-opened using hinge 103 to provide the second mode, as shown in position 307.

Figure 4:
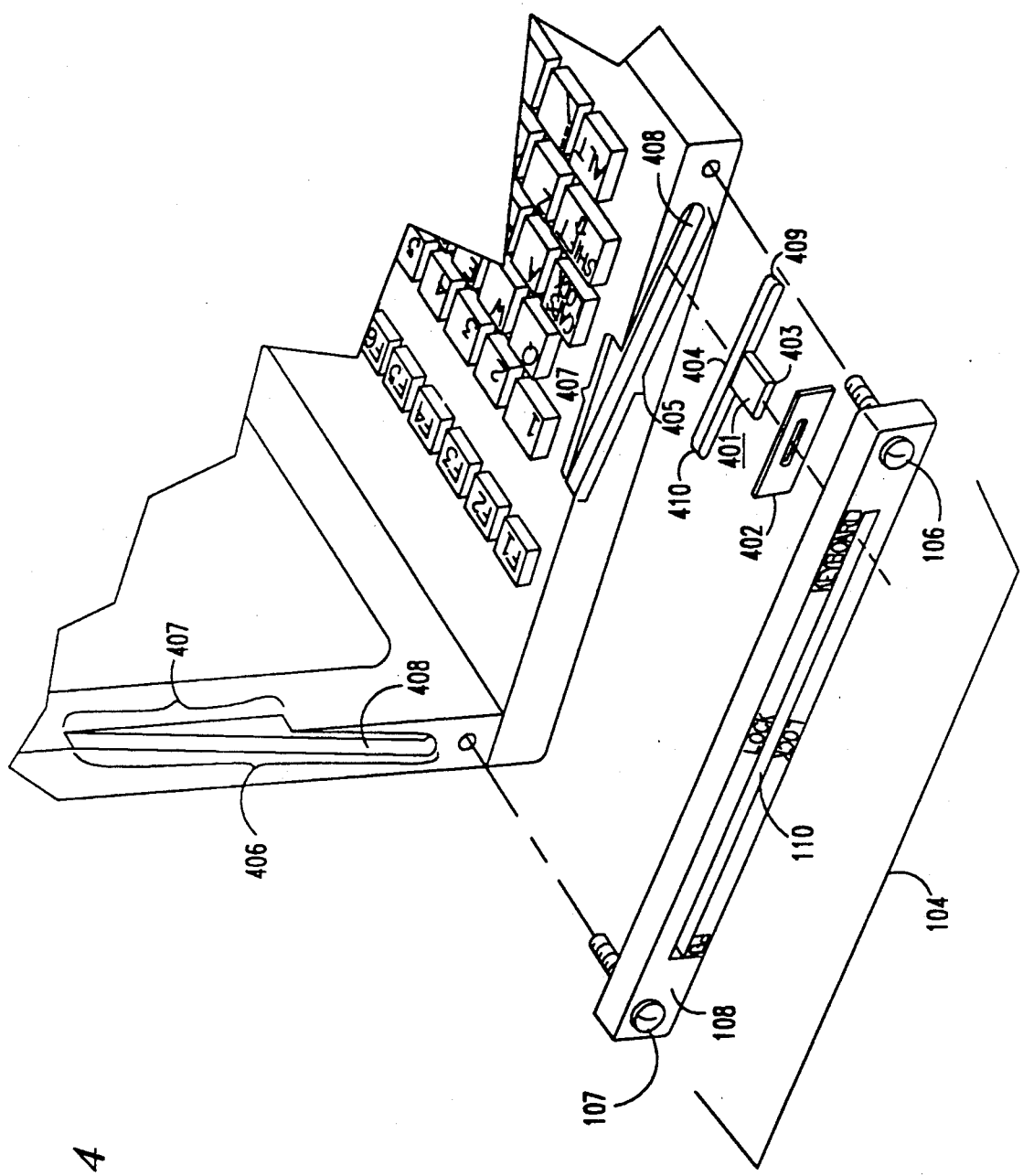
FIG. 4 is an exploded perspective view of the portion of FIG. 1 which reveals the interconnecting mechanism.

Refer now to FIG. 4 which shows an exploded view of dual-pivoting hinge 104. To provide mode selection and a locking mechanism, hinge 104 operates in combination with sliding element 401 and spacer 402. Element 401 has a first end portion 403 which extends through slot 110 in member 108 and a second end 404 which engages with slots 405 and 406 in the keyboard and display portions. Each of slots 405 and 406 has an open channel portion 407 which extends downwardly at an angle from a surface of either the keyboard or display to intersect with a closed channel portion 408. The locking mechanism can be engaged when the keyboard and display portions are folded one over the other, as shown in position 303 of FIG. 3, by centrally positioning sliding element 401 in slot 110 so that end 403 is positioned near the word "lock" on member 108. When the sliding element is so positioned, its protrusions 409 and 410 respectively engage with the closed channel portion 408 of slots 405 and 406 to prevent inadvertent opening of the computer. By positioning the sliding element in an off-center position in slot 110, either the first or second mode can be selected. For example, if the first mode of FIG. 1 is desired, the sliding element is positioned at the end of slot 110 adjacent to the word "keyboard" on member 108. When the sliding element is so positioned, protrusion 409 engages with closed channel portion 408 of slot 405. As a result, rotation of hinge 104 is permitted only about pin 107. In similar fashion, the second mode shown in FIG. 2 is provided by positioning sliding element 401 adjacent to the word "pen" on member 108 so protrusion 410 engages with closed channel portion 408 of slot 406. As a result, rotation of hinge 104 is only permitted about pin 106.

Figure 5:
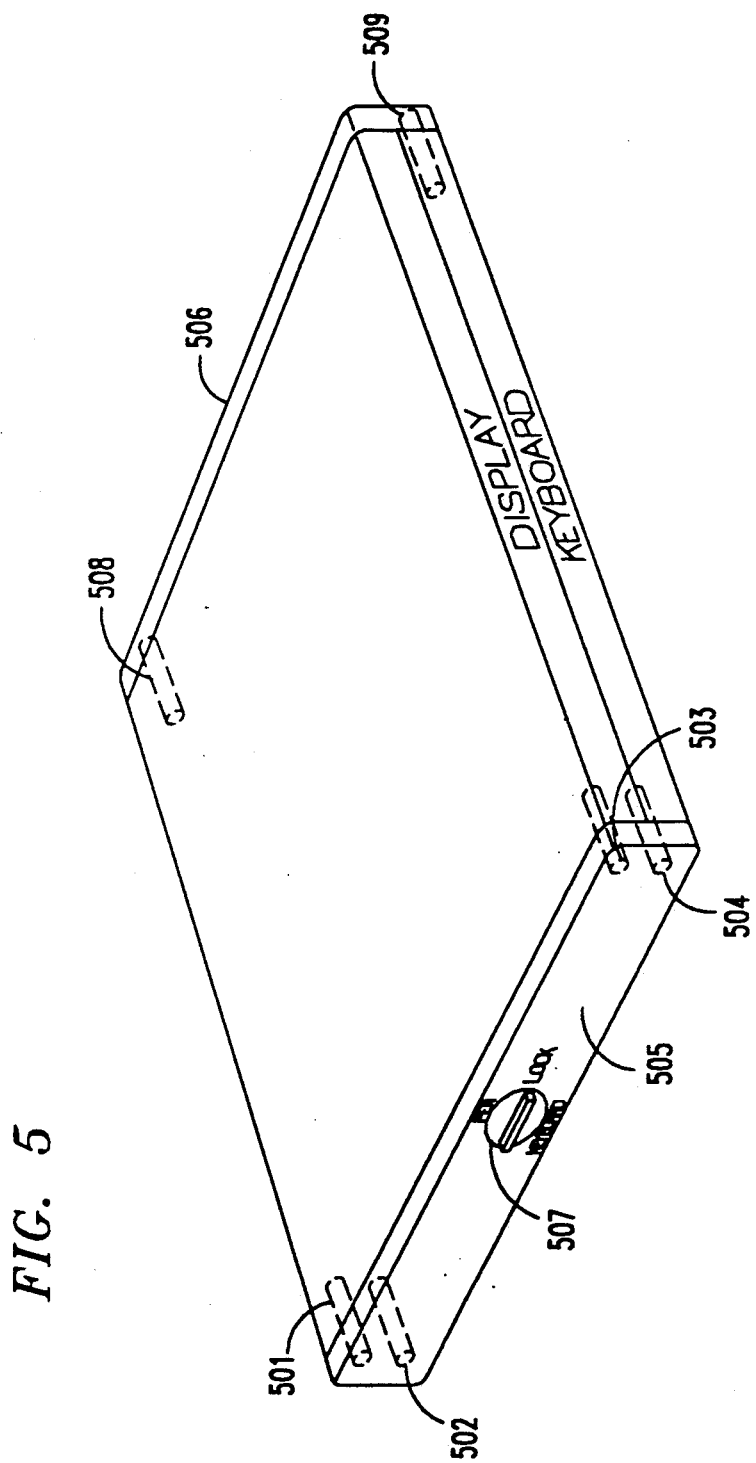
FIG. 5 is a perspective view of a second embodiment of the present invention.

FIG. 5 shows a second embodiment 200 of a computer arrangement in accordance with the present invention. This embodiment is identical to the first except for the replacement of the dual-pivoting hinge structure with a retractable pin structure which operates in response to a rotating knob. As shown in FIG. 5, there are four pins designated as 501, 502, 503 and 504 on one side 505 of computer arrangement 200. Two hinge pins 508 and 509, which are positioned similarly to pins 106 and 107 in FIGS. 1 and 2, are located on side 506 which is opposite to side 505. Pins 501 and 503 extend into the display portion, while pins 502 and 504 extend into the keyboard portion. Pins 502 and 503 are selectably retractable by the rotation of knob 507.

Referring to side 505, when control knob 507 is pointed toward the word "pen", pins 501, 503 and 504 protrude into the body of the display and keyboard. Pin 502 is withdrawn by a mechanism attached to the control knob so that the keyboard portion can be pivoted around pin 504. When opened, the keyboard portion is in a vertical position and the display is in a horizontal position. In similar fashion, when control knob 507 is pointed to the word "keyboard", pins 501, 502 and 504 protrude into the body of the display and keyboard portions and pin 503 is withdrawn. This permits rotation of the display portion about pin 501 to provide the keyboard and display portions in horizontal and vertical positions, respectively. Finally, when control knob 507 is pointed toward "lock", all of the pins are extended and the computer can't be opened. This is the desired position for transporting the computer.

Figure 6:
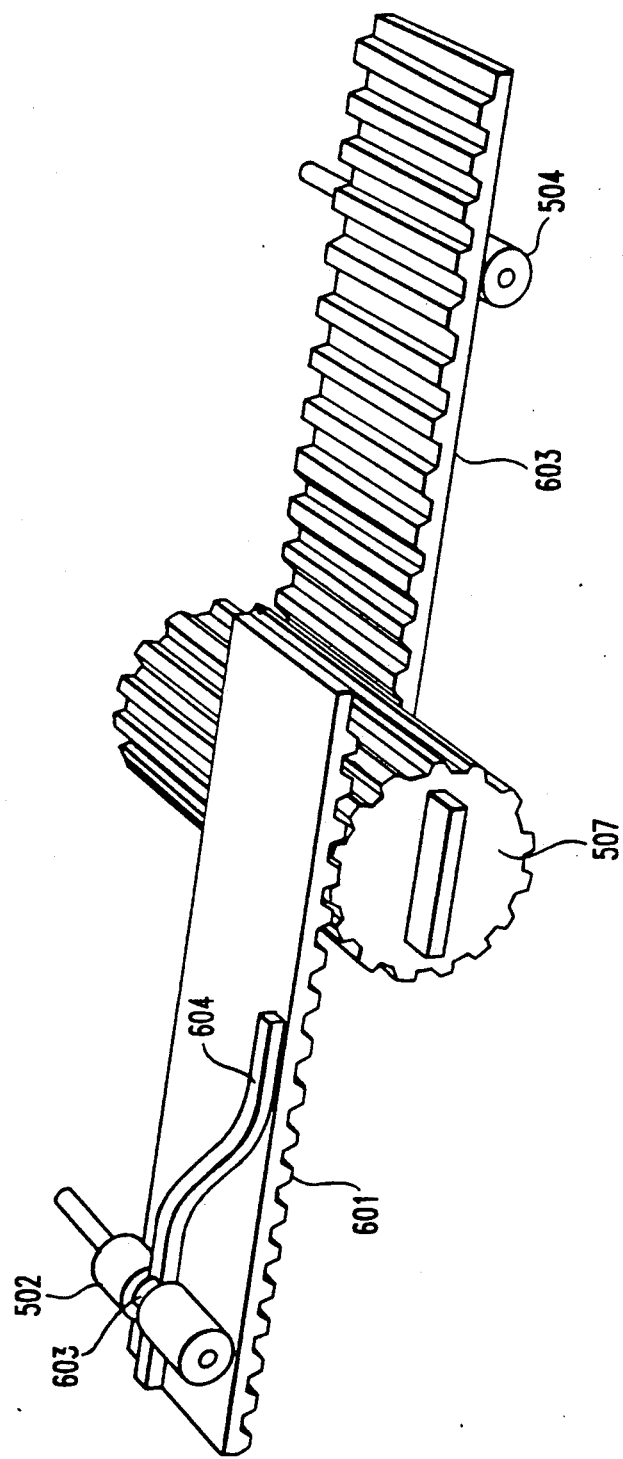
FIG. 6 is a perspective view of a portion of the interconnecting mechanism utilized in the embodiment of FIG. 5.

FIG. 6 shows the mechanism attached to control knob 507 to provide selective pin retraction. This mechanism includes two rack gears 601 and 602 which engage with pinion teeth formed in the circumference of control knob 507. Each of pins 502 and 504 is formed with a circumferencial slot 603 which engages with a rail member attached to a side of an associated rack gear. One such rail member 604 is shown in FIG. 6, the other rail member being on the underside or hidden side of rack gear 602. As the control knob is rotated toward the word "pen" in FIG. 5, the movement of the rack gear displaces rail structure 604 to selectively move or retract pin 502. In similar fashion, as the control knob is rotated toward the word "keyboard" in FIG. 5, the movement of the rack gear displaces the rail structure on the underside of rack gear 602 to retract pin 504.

It should, of course, be understood that while the present invention has been described with respect to specific embodiments, other arrangements will be apparent to those of ordinary skill in the art. For example, while in the disclosed embodiments, the keyboard and display portions are disposed at an angle of approximately 90° relative to one another in either of the two operating modes, such angle can be varied to suit the preference of a computer user. Or, for example, while the keyboard in the disclosed embodiments includes a plurality of individual keys, the keyboard can take other forms including a display screen wherein different portions of the screen are associated with different alphanumeric characters which can be selected by touching the display screen.

I claim:
1. A computer comprising
a keyboard portion having a top edge and a bottom edge;
a display portion; and
means for interconnecting said keyboard and display portions to form a dihedron, said interconnecting means being such that a selected either one of said edges is at the vertex of said dihedron, said interconnecting means being connected to said keyboard and display portions and maintaining said dihedron upon its formation.
2. The computer of claim 1 wherein said interconnecting means is a dual pivoting hinge which provides rotational capability about two axes.
3. The computer of claim 1 wherein said interconnecting means incorporates a locking mechanism which when activated maintains said keyboard and display portions in a predetermined position.
4. The computer of claim 1 wherein said interconnecting means includes pins which protrude into said keyboard and display portions and are selectively retractable.
5. A computer arrangement comprising
a keyboard portion including a plurality of keys, each key in said plurality having associated characters written thereon;
a display screen; and
means for interconnecting said keyboard portion and said display screen said interconnecting means being connected to said keyboard portion and said display screen and providing a first and a second position of said keyboard portion relative to said display screen, said first and second positions being such that said characters are in a right-side-up orientation relative to a computer user in each of said positions, said keyboard portion being adjacent to said computer user in said first position and said display screen being adjacent to and visible to said computer user in said second position.

6. The computer arrangement of claim 5 wherein said interconnecting mechanism is a dual pivoting hinge which provides rotational capability about two axes.

7. The computer arrangement of claim 5 wherein said dual pivoting hinge incorporates a locking mechanism which can selectively lock said computer arrangement when arranged in said first and second positions.

* * * * *